United States Patent [19]

Taylor et al.

[11] 4,040,960
[45] Aug. 9, 1977

[54] CATCH BASIN PROCESSING APPARATUS

[75] Inventors: Lauren P. Taylor, Swarthmore; Alex Petroski, Springfield, both of Pa.

[73] Assignee: LRS Research Limited, Broomall, Pa.

[21] Appl. No.: 709,566

[22] Filed: July 26, 1976

[51] Int. Cl.² .................................... B01D 21/00
[52] U.S. Cl. ............................ 210/96 R; 210/103;
  210/105; 210/195 R; 210/202; 210/241;
  210/258
[58] Field of Search ................. 210/10, 59, 60, 61,
  210/65, 66, 69, 70, 73 R, 78, 77, 96 R, 86–88,
  97, 98, 103, 105, 194, 195 R, 196, 197, 198 R,
  199–202, 205, 206, 252, 258, 260, 241, 170

[56] References Cited
U.S. PATENT DOCUMENTS

| | | |
|---|---|---|
| 1,331,239 | 2/1920 | Cartwright .......................... 210/241 |
| 3,128,786 | 4/1964 | Badgett .............................. 210/96 R |
| 3,262,571 | 7/1966 | Petretti .................................. 210/241 |
| 3,399,133 | 8/1968 | Gerdes et al. ..................... 210/96 R |
| 3,630,365 | 12/1971 | Woodbridge et al. ............... 210/241 |
| 3,659,712 | 5/1972 | Chaplin .............................. 210/96 R |

*Primary Examiner*—Thomas G. Wyse
*Assistant Examiner*—Benoit Castel
*Attorney, Agent, or Firm*—Benasutti Associates, Ltd.

[57] ABSTRACT

A novel mobile system for cleaning and processing catch basin and/or lagoon waste products is described wherein the degree of waste product dilution is carefully controlled prior to transmission to a mobile dewatering truck capable of producing a substantially dry land fill suitable end product and water suitable for recirculation or environmentally acceptable discharge to a process head or sanitary sewer.

25 Claims, 2 Drawing Figures

CATCH BASIN PROCESSING APPARATUS

BACKGROUND OF THE INVENTION

The present invention relates to the handling of thick, viscous or thixotropic materials, and more particularly to the reclamation from storage lagoons of dry, semi-dry or nearly gelatinous sludge produced as a by-product of various manufacturing operations and/or various conventional waste sludge sewage treatment processes.

Although the actual chemical composition of the materials to be removed from catch basins or lagoons will vary from location to location, normally such materials have been deposited in a liquid or semi-liquid state and have been stored in such lagoons or catch basins for a considerable period of time, which storage results in the thickening of the material due to decreasing moisture content. Moisture content may range from about 99.5% to as low as 60%, but commonly in the range of 92% to 85% after several years of aging in the lagoon. As described in U.S. Pat. No. 3,796,658, at this common moisture level the sludge does not behave as a fluid, but rather, resembles a heavy viscous or soft gelatinous material having thixotropic tendencies.

The problems which are encountered in cleaning lagoons or catch basins of this type are aggravated by the fact that (depending upon the constituency of the waste products disposed therein) chemical reactions, microbic growth, local geologic characteristics including soil porosity and water table levels, and the particular design and construction of the lagoon or catch basin to be cleaned result in extremely discontinuous deposits of materials to be removed. For example, depending on exposure, porosity, dwell time in the lagoon, the varying nature of the substances charged into the lagoon from year to year, and many other factors, the consistency and handleability of waste material to be removed from within any given lagoon, much less from one lagoon to the next, will vary markedly by depth and region.

Conventionally, lagoons, catch basins and similar installations have been brought from the dry, semi-dry or gelatinous state to a pumpable state by injecting fluid such as water into the material in order to increase the moisture content of the material to a point where the material is pumpable, at which time a conventional pumping apparatus is utilized to pump the resultant sludge to rail tank cars or trucks. It may then be removed from the lagoon for transport to a suitable dump site or other disposal facility. As further described in U.S. Pat. No. 3,796,658, it is not practical to attempt to pump even gelatinous or semi-liquid sludge which does not flow evenly since a pump placed in the sludge simply pumps out a small area or cavity and ceases to receive additional input after the immediately adjacent material is removed. Adding water to the sludge reduces the aforementioned flow and pumping problems to some extent, but the increased total weight and volume of the resulting material increases shipping and disposal costs. Since the material in the lagoons has normally lost moisture and thickened with age, it is desirable to transport the material in a thickened condition or with the addition of only the minimum amount of water necessary to facilitate pumping.

U.S. Pat. No. 1,331,239 illustrates an early portable pumping apparatus intended for use for the evacuation of cesspools, sumps, basins or depressions or excavations in which the character of the contents is such that they should not pass through the pump without partial separation of the solids contained in them. A multi-chambered settling tank is utilized in order to allow liquids to be separated from the collected solids and to be sprayed as desired. See also, U.S. Pat. No. 1,344,710 which appears to disclose an improvement over the device disclosed in U.S. Pat. No. 1,331,239 wherein water which has been separated from the solids is recirculated into the catch basin 3 and is used to supply ejector 4. A similar system appears to be disclosed in U.S. Pat. No. 1,343,471. Although the travelling apparatus for cleaning sewer basins and the like disclosed in these three patents first became known in approximately 1920, the method disclosed therein for cleaning catch basins and the like has not changed substantially in the intervening 56 years. See, for example, U.S. Pat. No. 2,753,877 dated July 10, 1956 which discloses injection of water into a sandpit to agitate the sand into a suspension and subsequent pumping of the suspension into a settling tank in which the sand is allowed to settle out and the water recirculated for subsequent use to further agitate material contained within the basin.

Also note U.S. Pat. No. 3,262,571, dated July 26, 1966 wherein a mobile unit is disclosed for use in cleaning out catch basins and the like. The specification of this patent states:

"In cases where the debris is substantially dry, the eduction unit deposits a fluid into the sewer or catch basin in order to loosen the debris and to mix it with a fluid so that it will be easily sucked up by the eduction unit. The mixture is deposited in the settling tank where the heavier debris falls to the floor. The fluid with the lighter debris in suspension passes through a series of baffles and/or strainer so that the lighter debris is removed from the fluid. The fluid which is now relatively free of debris may be redeposited into the catch basin and reused to loosen the mix with additional debris. Thus, the fluid is recirculated. An example such as the eduction unit is shown in U.S. Pat. No. 2,010,538, dated Aug. 6, 1935." Specification U.S. Pat. No. 3,262,571, column 1, lines 17–30.

While relatively sophisticated methods have been developed in order to process conventional sludge at treatment plants, such instrumentation has not been applied to dewatering and/or treating materials collected during cleaning catch basins. While it might initially appear that a system such as that disclosed in U.S. Pat. No. 3,630, 365 might be directly applicable to the art of catch basin or lagoon cleaning, such systems are intended to be used to process conventional sludge which, in comparison to catch basin waste materials, is an extremely homogeneous material of known constituency and chemical and/or bacterial composition. Additionally, such systems are fed with a liquid sludge containing a relatively small solids content thereby enabling the construction of a system which is efficient for its intended purpose, but which could not adequately process waste materials as directly collected from conventional lagoons or catch basins. Other patents generally disclosing systems, methods and equipment for processing sewage sludge and similar types of waste are U.S. Pat. Nos. 3,045,827, 3,275,547, 3,248,323, 3,226,317, 3,732,697, 3,720,608, 1,696,014, 2,228,017, 3,577,341, 3,739,912, 2,120,658, 2,391,494, 2,359,748 and 3,879,285.

Other patents disclosing the use of a settlement or recirculation concept include U.S. Pat. Nos. 1,873,598, 3,317,049, 2,240,167 and 3,616,917.

Subsidiarily, many processes and/or chemical reagents have been developed which are useful generally in combination or as a part of various dewatering processes. See, for example, U.S. Pat. Nos. 3,300,407, 3,897,333, 3,849,307, 3,409,546, 3,514,398, 3,720,609, 3,841,102, 3,899,419, 3,907,677 and 3,806,450.

SUMMARY OF THE PRESENT INVENTION

The present invention provides a novel catch basin cleaning system wherein various means are provided which transfer material obtained from the catch basin to subsequent processing operations only in the event that the material is determined by various monitors to be of an optimal nature for introduction into the subsequent process phase. For example, the pumping means will transfer materials to the equalization means only if that material contains a preselected percentage of solids, which percentage is selected for its compatability with the subsequent processing means which are mounted on an adjacent mobile apparatus. Additional means are provided to insure that a maximum flow of material will be produced. For example, ejectors are used in combination with novel optimal pumping, monitoring and recirculation means in order to insure that the liquid which is collected from the catch basin has neither too little or too great a solids content for subsequent equilization and dewatering operations. In the event that a liquid is being pumped by the pumping means which contains the optimum solids content, this liquid is admitted to a subsequent equalization process which equalizes, mixes and homogenizes the collected material for subsequent treatment. Dewatering, treatment, conditioning and discharge follow equalization and interact to produce the desired end products. Water suitable for return to the process head or sanitary sewer may be produced. Alternatively, water may be recirculated to be added directly into either the ejector system or to dilute the material which is being collected by the pumping system.

Throughout the process, material which is collected from the catch basin, hereafter referred to as the wash effluent or wash stream, is monitored qualitatively and quantitatively at numerous stages in the process. By monitoring the nature and quantity of this flow, the level of the equalization means, the density of the dewatering means input, the centrate turbidity centrate flow rate and centrate pH, various valves are automatically operated which regulate the bypass of the wash effluent back into the catch basin, the flow of material to the equalization means, the flow of thickened material either to the conditioning means or again to the equalization means, the flow of material to the process head or ejector, the amount of virgin water added to the pumping means, and the rates of the pumping means, dewatering means, treatment (chemical feed) means and conditioning means.

As a result, the present system is capable of adapting superior dewatering equipment to the art of catch basin cleaning which, heretofore, has relied upon settling tank type processing in order to collect and then transport materials removed from catch basins. Accordingly, a primary object of the present invention is the provision of an economic and effective apparatus for cleaning catch basins, lagoons, ponds, digesters, tanks, pipelines and sedimentation basins. A further object of the present invention is the provision of a high flow rate, high through-put mobile processing apparatus capable of proceeding easily from one cleaning requirement to the next, as needed. A further object of the present invention is the provision of a catch basin cleaning apparatus which greatly reduces the volumes of pressurized cleaning water added or required to clean a given catch basin. A further aim of the present invention is to significantly reduce the volume of waste to be transported and disposed of. A further aim of the present invention is to produce a material which is physically or chemically acceptable for disposal. These and other objects of the present invention will become apparent from the following more detailed description.

DETAILED DESCRIPTION OF THE DRAWINGS

Although specific forms of the invention have been selected for illustration in the drawings, and the following description is drawn in specific terms for the purpose of describing these forms of the invention, this description is not intended to limit the scope of the invention which is defined in the appended claims.

The catch basin cleaning system of the present invention generally comprises a pumping means, equalization means, chemical feed (treating) means, dewatering means, cake conditioning means, centrate treating means, cake disposal means, and water supply means, each of which means coacts with the other means to produce a maximum through-put rate of materials suitable either for recirculation or disposal, depending upon the particular phase of the cleaning cycle.

Figure 1:
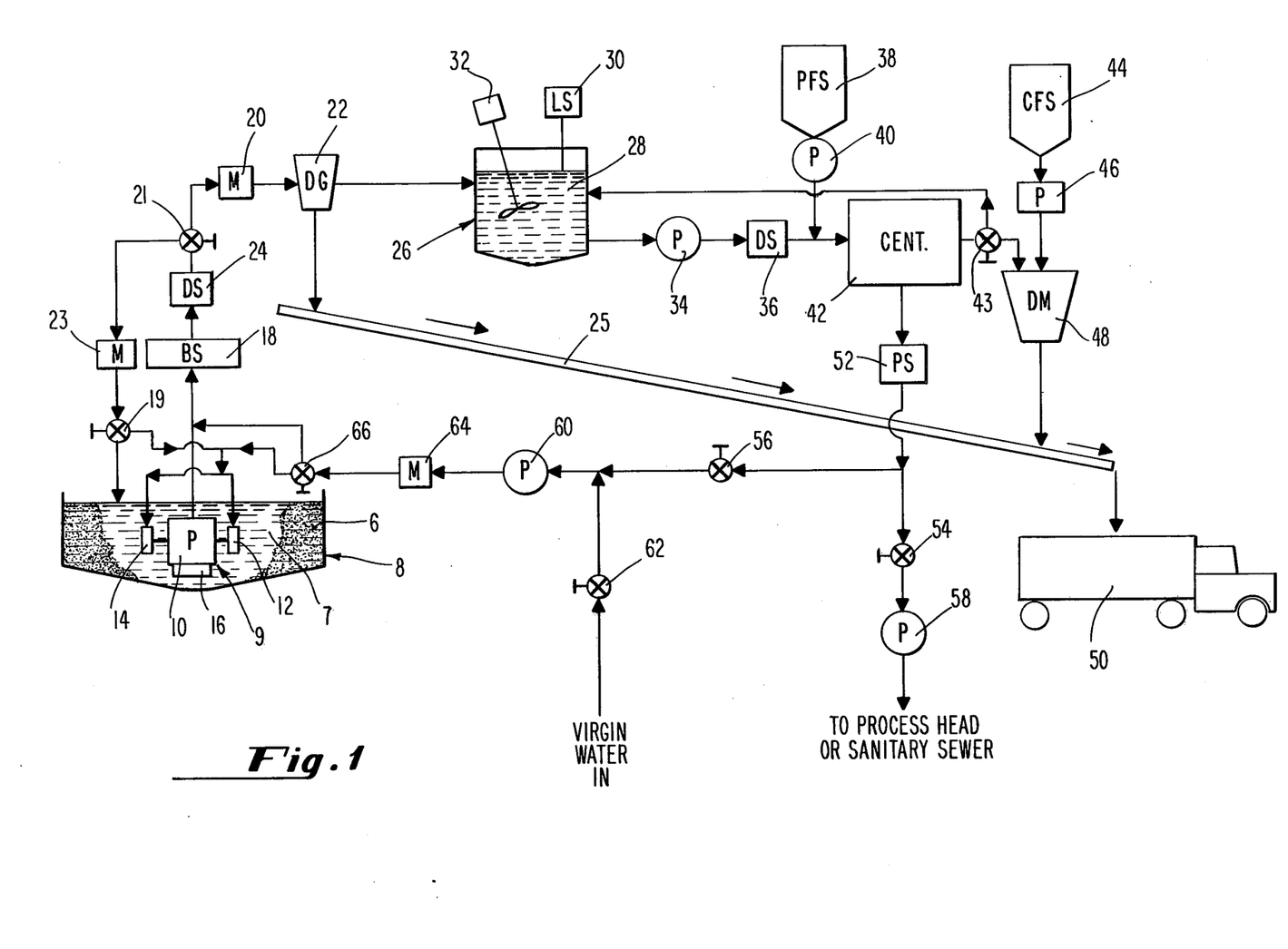
FIG. 1 is a schematic view of the catch basin processing system of the present invention.

Referring now to FIG. 1, a catch basin designated generally 8 is illustrated which is substantially filled with solid material 6 and semi-solid material 7 which may already have been subjected to a certain degree of water addition in accordance with the present invention. Shown disposed within the catch basin in the semi-solid or liquid portion 7 is the catch basin pumping means of the present invention which comprises a catch basin pump 10, a communitor 16 and ejectors 12 and 14. This catch basin pumping assembly is designated generally 9 in FIG. 1. The ejectors 12 and 14 function in a relatively conventional manner to inject liquid material such as virgin water to homogenize and increase the moisture content of the material in the vicinity thereof for subsequent pumping by a catch basin pump 10. The ejectors 12 and 14 are shown supplied by liquid lines which will be discussed more fully hereinafter.

The output of the catch basin pumping assembly is directed into the pumping system shunt assembly which generally comprises a bar screen 18, a density sensor 24, a shunt flow rate monitor 23, an ejector bypass valve 19, and a shunt valve 21. The output from the pumping system therefore is subjected to a course straining operation by the bar screen 18 and then is monitored by the density sensor 24 which monitors the percentage of solids in the material collected by the pump 10 to determine whether the liquid contains an optimum degree of solids to be passed on to the remaining portions of the system. In the event that the solids content is lower than desired, and further in the event that the function of this density sensor 24 is not overriden by other sensors in the system, as will be described more fully hereinafter, shunt valve 21 operates to shunt the material collected back through shunt flow rate monitor 23 and ejector valve 19 to be fed back into ejectors 12 and 14. As will be discussed more fully hereinafter, if the density sensor 24 senses too high a percentage of solids in the material collected by pump 10, it will either open dilution valve 66 of the water addition system in order to reduce the solids content of the material collected or, alternatively, in the event that the remaining portions of the system can not handle the material collected from the pump, shunt valve 21 will be operated to again divert the material collected through the shunt flow rate monitor 23 and through ejector bypass valve 19 directly back into the catch basin. While the normal position for the ejector bypass valve 19 will be to direct the flow of materials back into the ejectors 12 and 14, in the event that the material to be returned to the catch basin contains too high a percentage of solids to effectively travel through the ejector mechanism 12 and 14, or alternatively, in the event that the ejectors are already being supplied with their maximum handling capacity of liquids, as determined by water addition flow rate monitor 64, then ejector bypass valve 19 will operate to return the shunted material directly into the catch basin.

As may be seen from the above description, the pumping means is a self-regulating system which is intended to produce pumpable material within a desired solids range and which is responsive to information received from both the water supply means and the equilization means in order to provide an optimum through-put through the system. In light of the above description, the function of the pumping means may be described as follows: the pumping means accomplishes the washing and moving of solids and sludges to the input of the pump 10 by using a pressurized wash-water stream which agitates solids into a pumpable suspension. Pressurized washing is achieved by use of high pressure water jets attached to a standard centrifugal-submersible pump in the preferred embodiment. In this preferred embodiment, the jets or ejectors 12 and 14 rotate through a $4\pi$ solid angle under power of water passing through an internal jet water turbine system. The pressures used can range to 500 psig generating (in the case of high flow rate) significantly higher forces than can be handled manually, as is the case in current practice. The high pressure generates a velocity head with high kinetic energy which partially substitutes for the high volume of wash water used in current practice. Kinetic energy is used to achieve particulate suspension and pumpable flow. Preferred jets or ejectors 12 and 14 may be produced by modifying jets supplied by the Gamlen Chemical Co. under the trademark GAM-A-JET II.

Also as described above, the flow to the ejectors 12 and 14 is controlled by density sensor 24 and other portions of the system such as the water addition system which similarly control a variable speed pump motor which modifies the output of the ejectors 12 and 14. The flow rates in the jet or ejector lines may be determined either by flow meters 23 and 64 or by additional magnetic flow meters disposed within the ejector assemblies 12 and 14. This controlled feedback loop minimizes the addition of water added during the cleaning process to thereby minimize the amount of dewatering necessary at later stages in the processing of collected materials.

In addition to the above described functions, the pumping means, and more particularly the pump system shunt, provides a filtering of large, course and abrasive materials and particulates (including grit, fibers, plastics, and particles larger than approximately 250 microns in diameter) by using well-known filtering methods such as a bar screen, comminution and maceration. In combination with grit removal by a degritter 22 which may comprise standard internal separators such as hydrocyclones or rotary screens, these filtering methods remove and retain solids as will be described more fully hereinafter. Size reduction is also accomplished at the inlet suction part of the main washings submersible catch basin pump 10 by the use of an integral cutter disc as may be purchased with a Midland ABS submersible pump, or by the use of a continuous, mechanical self-cleaning filter such as one currently marketed under the trademark "THE AQUA GUARD", which is a screen supplied by Dyneco. The comminutor 16 may be one such as marketed by Franklin Miller, Inc. under the trademark DELUMPER or marketed by Dorr-Oliver, Inc. under the trademark GORATOR, or marketed by Robbins & Meyers under the trademark MOYNO "MAZ-O-RATOR". The cleanings residues comminution which is required for the mechanical separation of liquid/solid fractions (preferably by solid bowl centrifuge) is achieved preferably before the cleaning flow enters the system. Therefore, the comminuting device 16 is attached to the suction input of the submersible catch basin pump 10 in the preferred embodiment. This will also serve to reduce washings volume by reducing or eliminating the need to back flush this pump. Back flushing may, of course, be attained by opening valve 66 and closing valves 21 and 19 in order to allow the water addition system to back flush the submersible pump 10.

Once a determination has been made that the material collected by the pump 10 and passing through the density sensor 24 is of a density suitable for further processing, shunt valve 21 will be operated to allow all or any portion of the material collected to pass through equalization means flow rate monitor 20 into the equalization tank. The equalization means generally comprises the equalization system flow rate monitor 20, a degritter 22 (as mentioned above), a grit conveyor 25 and equalization tank 26 containing slurry 28 therein, a level sensor 30 and an agitator 32. The equalization means flow rate monitor 20 in combination with the shunt flow rate monitor 23 will determine the rate of material actually being collected by the pump 10. Depending on the processing speed of the dewatering and subsequent operations following the equalization means, it may be necessary to increase the flow rate of material into the equalization tank, as monitored by equalization system flow rate monitor 20, in order to insure that an appropriate slurry level within the equalization tank will be maintained. In order to increase the flow rate of material into the equalization system, the equalization system flow rate monitor 20 is adapted to operate shunt valve 21, sewer valve 54, virgin water valve 62 and dilution valve 66, a suitable balance of which will always insure sufficient flow into the equalization system to prevent the slurry 28 within the equalization tank 26 from falling to an unacceptably low level.

As discussed above, grit removal is accomplished by a degritter 22 which is a standard initial separator such as a hydrocyclone or rotary screen. The removed solids are retained in the grit hopper and merged with the dewatered, conditioned cake output by grit conveyor 25. Other solids, after size reduction, remain in the wash process stream and become part of the solid, freshened cake at a later point in the process.

The purpose of the equalization means is to equalize and homogenize the flow to the dewatering means by using an in-line flow equalization basin 26. The flow equalization unit serves to dampen washing process flow variations thereby avoiding disruptions in the separation/dewatering process due to sudden flow changes, and helps to achieve a nearly constant flow rate to the separation/dewatering system. It is believed that this approach is far superior to side-line equalization, particularly when used in combination with the novel pumping system described above. In order to achieve further uniformity in suspended solids concentrations within the equalization tank, a mechanical mixer or agitator 32 is utilized such as a turbine flocculator. The equalization tank 26 should be selected to be of a volume equal to approximately 10 times the unit accumulation for the process in GPM. In the preferred embodiment, the GPM valve is approximately 200, thereby indicating in the preferred embodiment that accumulation per unit time is 200 gallons and the basin volume will be approximately 2,000 gallons, or 266 cubic feet.

The level of tank 26 is preferably indicated by a continuous, proportional control signal generated by an ultrasonic transducer. Such a transducer is marketed by Inventrox Industries, Inc. The input pumping rate to the equalization tank is monitored by equalization system flow rate monitor 20 and will, of course, be affected by the through-put of the submersible pump 10, head losses through screens, degritters, and piping. Flow rate control is achieved by variable speed pumping, flow control valves and/or valving which bypasses the pumping effluent back to the catch basin being cleaned, as described aforesaid. While a preferred range of solids in the wash stream will be selected for, which is typically between 2 and 4% solids, the system is designed to accept a wider range of solids contents, i.e. 0.25% 6% solids or even up to the maximum pumpable solids percentage in order to achieve efficiency in the system and to insure that the dewatering means is not required to shut down. In particular, as the level of slurry 28 within the equalization tank 26 falls below a certain preferred level, the logic circuitry associated with density sensor 24 will allow a lower solids content wash stream to pass by shunt valve 21 into the equalization system. Conversely, when optimal levels of slurry 28 are maintained in the equalization tank 26, only wash water additions containing optimal solids content will be admitted into the equalization system. In accordance with the preferred embodiment of the present invention, the centrifuge density sensor 36 will additionally act as a feedback mechanism to monitor the density of material which has been pumped from equalization tank 26 into the centrifuge. In the event that the material within the equalization tank 26 is not of a preferred density, density sensor 36 will additionally coact with logic circuitry associated with density sensor 24 in order to permit materials to pass through shunt valve 21 into the equalization system, which will have the effect of counter-balancing the solids content in the equalization tank 26. That is to say if the material or slurry which is passing through the density sensor contains too little solids for optimum dewatering efficiency, then the density sensor 36 will coact with density sensor 24 to allow materials collected by the pump 10 to pass into the equalization system if the density of those materials is such that they will tend to thicken the material contained in the equalization tank. By the same token, if the material contained within the equalization tank 26 is too thick, i.e. has too great a solids content, valve 66 may be utilized in order to insure a lower solids input into the equalization system.

Generally, material contained in a catch basin comprises slimes, greases, sediments, precipitates, slurries, muds, scums, sludges and suspensions which together may be considered to comprise solid and liquid fractions which, as discussed above, may be expressed in a percentage in terms of weight. Within the liquid fraction of the material collected, four different types of liquid can be identified:

1. free liquid
2. floc liquid
3. capillary liquid
4. particle liquid

Free liquid is not attached to sludge solids in any way and could be removed by simple gravitational settling as discussed in connection with the prior art processes previously applied to catch basin cleaning. Floc liquid, on the other hand, is trapped within the flocs and travels with them. Its removal is possible by mechanical dewatering such as by a centrifuge as will be discussed more fully hereinafter. Capillary liquid adheres to the individual particles and particle liquid is chemically bound to the individual particles. Accordingly, the system of the present invention further comprises a treating or polymer feed means, dewatering means, cake disposal means, and water supply means adapted to adequately handle each of these four types of liquid.

Referring now to the treating or polymer feed means, a dry chemical feed system referred to in the drawings as a polymer feed system 38 and polymer feed system pump 40 is provided which adds conditioners and flocculents to the equalized wash stream before or during dewatering. Since this unit operation includes a holding tank for liquefied or dissolved chemicals, it also constitutes a liquid chemical feed system. This system is a typical automatic dry polymer feed system such as described in the technology transfer publications: E.P.A. 625/1-75-003a, Process Design Manual for Suspended Solids Removal, January 1975, pages 5-58. To a great extent, the activation of the chemical feed system 38 will determine the turbidity and other characteristics of the centrate emitted from centrifuge 42 as monitored by photosensor 52. Accordingly, photosensor 52 which is a turbidity monitor will incorporate logic circuitry which will control the amount of chemicals injected into the wash stream, as well as controlling sewer valve 54 and centrate recirculation valve 56. Generally, at the beginning of the cleaning process, all of the centrate passing through photosensor 52 will be recirculated through centrate recirculation valve 56 to be reinjected into the catch basin by ejectors 12 or 14, or to otherwise dilute the wash stream through valve 66. During this stage of the process it is not necessary to control the turbidity of the centrate within the same closely defined levels as will be necessary when the centrate is to be discharged to the process head or sanitary sewer. Consequently, the chemical or polymer feed system 38 may be inactive during the initial portions of the cleaning process. During the later portions of the cleaning process, it is anticipated that the catch basin will have been fully homogenized and that a sufficient amount of water will have been added so that the centrate is preferably discharged to the process head or sanitary sewer through sewer valve 54 and sewer pump 58. In this event, the turbidity and other characteristics of the water must be carefully monitored in order to satisfy environmental standards. It is therefore anticipated that when the sewer valve 54 is open and the centrate recirculation valve 56 is closed, that more stringent turbidity requirements will be in effect necessitating the increased addition of chemicals from the polymer feed system 38, which in turn will be controlled by information transmitted from the photosensor 52 to the polymer feed system 38. This inter-relationship results from the fact that the turbidity level is related to the Zeta potential of colloids found in the washing stream. Therefore the signal received from the photosensor will help ascertain and regulate the amount of additives necessary to reach a Zeta potential valve optimal for coagulating the colloidal dispersion when further de-stabilization is required.

While a photosensor 52 has been discussed above in connection with the monitoring of centrate quality, it is well within the scope of the present invention to use other monitoring means in place of or in addition to photosensor 52 for the purpose of qualitatively and/or quantitatively monitoring the centrate to determine the suitability of its disposal according to other parameters. For example, while turbidity is the most common measure of the suitability of a liquid for disposal, given the nature of the catch basin materials collected, it may be more desirable to qualitatively monitor the centrate for other properties. For example, where the catch basin contained or was suspected to contain a relatively high proportion of heavy metal residues, the photosensor 52 could be replaced or supplemented by a pH monitor requiring a pH of approximately 11 or greater prior to disposal of the centrate in a process head or sanitary sewer. In this instance, the polymer feed system 38 would additionally comprise means for introducing treating agents, such as lime, into the wash stream prior to or during dewatering which would insure this relatively high centrate pH, thereby in turn insuring that heavy metals contained in the wash stream prior to dewatering would be converted into insoluble oxides or hydroxides of heavy metals and therefore that these heavy metal constituents will become part of the thickened portion of the wash effluent and subsequently will be incorporated in a dry cake for environmentally acceptable disposal. It may therefore be seen that the dewatering means of the present invention may further comprise a centrate sensing means for qualitatively sensing the nature of the liquid portion produced by said dewatering means. This centrate sensing means may also control a polymer feed or treating means for treating the wash effluent prior to or during dewatering by the dewatering means, and further may control that portion of the centrate which is recirculated to the catch basin.

The liquid/solid fraction separation (wash stream residues dewatering or thickening) is effected by a standard technique such as vacuum filtration, centrifugation, pressure filtration, moving screen concentrator, belt pressure filtration, capillary dewatering system, or rotary gravity concentrator. Separation by centrifugation and centrifugation by solid-bowl centrifuge is preferred due to its compactness and suitability for mobile, truck/mounted operation, as well as due to the flexibility and general ease of this continuous feed operation. For this reason, a solid/bowl centrifuge is illustrated in the drawings. In specialized cases where the cleaning rate is not an economic consideration because of the overriding need for maximum cleaning residue volume reduction and cake dryness, pressure filtration will be the preferred process. In cases where thickening (as opposed to cake production) is to be achieved, a disc centrifuge will be preferred. Operation of the standard dewatering device (solid/bowl centrifuge) will be optimized by feedback from an effluent density sensor 36 at the input of the centrifuge and a centrate sensing means 52 at the output of the centrate effluent. Input pumping rate, chemical flocculent addition rate, differential scroll rpm and bowl rpm are automatically controlled to achieve maximum cake dryness which is consistent, when desired, with a centrate that can be recycled to the sanitary sewer or head of the process stream associated with a catch basin being cleaned. As described above, in the event that the centrate is not to be discharged but rather is to be recirculated, the system will be controlled only for the desired cake dryness consistent with suitable disposal processes.

In spite of the above described controls to optimize the density of materials to be introduced through the centrifuge 42 or other dewatering process, it is, nonetheless, contemplated that in some instances input from the equalization process will not contain a sufficient solids content to produce a suitable cake end product which may be disposed in an environmental manner. Therefore, depending upon the density of the material which is introduced into the centrifuge 42, as sensed by the density sensor 36, centrifuge shunt valve 43 is operable to shunt materials back into the equalization tank 26 so that the centrifuge 42 will act, in this instance, as a thickener and not as a cake producer. In this case, of course, the thickness or solids content of the slurry 28 within the tank will be substantially increased, and of course, in this mode, i.e. when the object of the process is to increase the density of the slurry 28 within the tank 26, the remainder of the pumping system will be adapted to feed only relatively dense materials into the equalization system unless, of course, the demand for materials within the equilization tank overrides the necessity to receive a relatively dense wash stream. It is therefore anticipated that the material which is allowed to be discharged into the dry mixer 48 from the centrifuge will be controlled as to its moisture content so that, when desired, only a suitable dry cake material will be discharged from the dewatering process. As an alternative, it is possible to use the entire system only as a thickening system and to replace the dump truck 50 with a tank truck such as might be desired when the resultant liquid sludge will be barged for disposal at sea.

In the preferred embodiment, the solids cleaning fraction (thickened portion) issuing from the dewatering process through centrifugal shunt valve 43 into the dry mixer 48 will be conditioned by a cake conditioning feed system 44 and conditioner feed pump 46. The material will be conditioned with lime and other additives and will be deodorized and disinfected prior to disposal so that it will approximate soil and will have significant positive value as soil cover in a sanitary land fill. This may be accomplished by use of a standard dry feeder bin system such as marketed by Vibra-Screw, Inc. under the trademark "LIVE BOTTOM BIN". Odor control and disinfecting chemicals such as lime, powdered carbon, and others will be added to cakes-residue by feeding both into a dry mixer 48 such as a standard cement mixer. The mixed, dry cake will be screw-conveyed to dump trucks 50 for disposal.

The preferred embodiment of the present invention will additionally comprise a water supply means which comprises a water addition pump 60, a virgin water valve 62, a virgin water supply, a water addition flow rate monitor 64, a dilution valve 66 and an input from the centrate recirculation valve 56 as described above. At the beginning of the process, of course, very little liquid will be present in the catch basin and it will be necessary to add virgin water through valve 62 and pump 60 to supply sufficient water to ejectors 12 and 14 to produce a pumpable suspension within the catch basin, designated generally 8. Once this priming process has gotten underway, a greater amount of water required for the ejectors 12 and 14 will enter the ejectors through recirculation of the centrate through centrate recirculation valve 56 and through shunt valve 21 and ejector bypass valve 19. It is anticipated during this phase of the process that virgin water will be necessary only to replace the amount of moisture retained in the dry cake if this exceeds the amount of moisture originally present in the catch basin material to be processed. Near the end of the process, the solids within the catch basin 8 will have been brought to a fully pumpable state and it is anticipated that only a portion, if any at all, of the centrate need be recirculated through recirculation valve 56 and subsequently through ejectors 12 and 14 in order to maintain the materials in the catch basin in a suspension. During this portion of the cycle, sewer valve 54 will be opened and the sewer pump 58 will discharge water to the process head or sanitary sewer. As a result of the above described process, it is anticipated that a large process head water tank will be sufficient to supply the entire water requirements for cleaning a moderate sized catch basin and that water will be lost from the overall system only by the amount that the moisture in the cake exceeds the moisture contained in the catch basin before cleaning starts. Alternatively, in the event that the catch basin moisture is relatively high, it is anticipated that water will actually be generated by the cleaning of the catch basin and will be available to the process head for industrial use.

Referring now to FIG. 1, it may be seen that the present system accomplishes seven basic unit operations, i.e.

Figure 2:
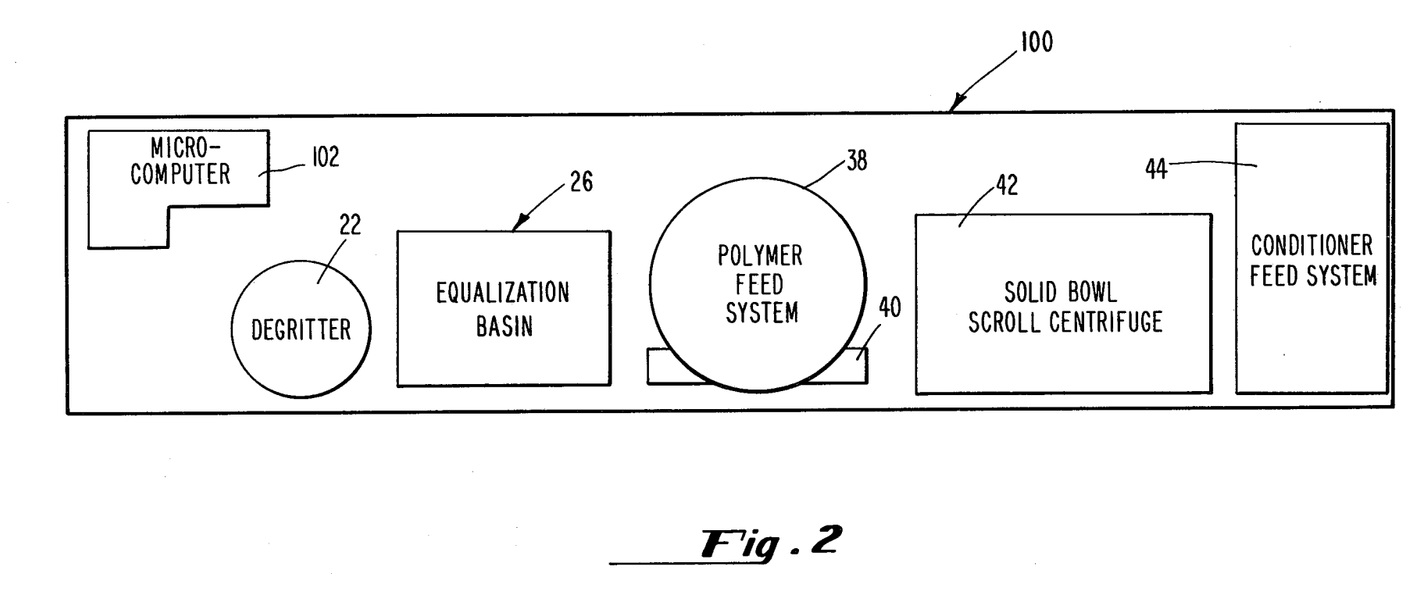
FIG. 2 is a diagrammatic top view representing a truck trailer in which certain equipment suitable for use in the preferred embodiment is shown disposed.

1. washing and pumping
2. wash-water addition control
3. multi-staged comminution, screening and grit removal
4. residue flow equalization and control
5. residue conditioner and flocculent addition
6. dewatering or liquid/solid fraction separation and controlled recycling
7. solids conditioning prior to disposal It is anticipated that the equipment illustrated in FIG. 2 is easily mounted on a standard truck-trailer with the addition of monitoring and control systems which provide for automatic operation of the entire catch basin cleaning operation. The truck designated generally 100 is shown in FIG. 2 having disposed thereon a degritter 22, equalization basin 26, polymer feed system 38, pump 40, solid/bowl scroll centrifuge 42 and conditioner feed system 44. A micro-computer 102 is seen disposed in one corner of the trailer designated generally 100 which microcomputer generally comprises logic circuitry in association with the various sensors discussed above to facilitate operation of the equipment incorporated in the system as described above. It is understood that while a mini or micro-computer is preferred as a matter of economics, the particular logic functions described throughout this specification may also be suitably accomplished using standard binary logic circuitry, as is well known in the art.

The particular sub-systems used in combination in the preferred embodiment of the present invention, in addition to that already described, will be the standard type known to the art. Pumps, for example, with the exception of the modified centrifugal submersible pump 10 attached with comminution equipment for maceration and the attached mobile pressure washing jets, will be of the progressive capacity type for the residue and chemical feed pumps, and will be of the shear-sensitive metering polymer feed type for the polymer feed pump 40. The wash stream and centrate pumps will be standard centrifugal pumps, preferably open impeller or torque-flow (recessed impeller) type equipped with the variable speed drives. All pumps will have variable speed drives capable of remote control, as, for example, SCR drives. Solids, on the other hand, will be conveyed by conventional means such as standard screw or trough conveyors. If pumped, solids residue containing less than 30% solids by weight may be pumped into tank trucks or for recirculation into the equilization tank 26 by open throat pumps. Preferably, standard piping and hosing suitable for quick-disconnect coupling will be used to provide modular and flexible connections between unit operations.

As seen from FIG. 2, it is not anticipated that during operation the entire catch basin processing system may be mounted on a single trailer truck. Rather, it is anticipated that the pumping means including the shunt will be easily transportable around the job site and will be disposed in or in closer proximity to the catch basin so that a minimum of energy will be required in order to shunt unacceptable materials back into the catch basin as aforesaid. The equilization, dewatering, chemical (polymer) feed, conditioning and cake disposal means, on the other hand, are all generally located on a single mobile unit as illustrated in FIG. 2 and therefore may be easily trucked from site to site. Depending upon the particular location of the virgin water supply and/or the process head or sanitary sewer, it is contemplated that during operation the water supply means will be disposed either in close proximity to the pumping means or preferably in close proximity or as a part of the mobile unit illustrated in FIG. 2. In the latter instance, only two pipelines need connect the pumping means with the remainder of the system, namely the pipeline from the pumping means to the remainder of the system and the pipeline connecting the water supply means to the pumping means. It is therefore anticipated that the pumping means may work quite efficiently and effectively at distances which are remote from the site of the truck trailer illustrated in FIG. 2.

The final mobile unit which is a part of the catch basin cleaning system of the present invention is illustrated as dump truck 50 in FIG. 1 and is a mobile unit easily adaptable for stationing in the vicinity of the truck trailer illustrated in FIG. 2. In the instance where a dry mixer 48 is a cement mixer, and is not contained within the unit illustrated in FIG. 2, then conventional equipment is employed in order to transfer material from the dry mixer 48 and the grip conveyor 25 into the truck 50.

It will be seen from the above discussion that the catch basin cleaning of the present invention is adapted for fast, efficient cleaning of a catch basin having a wide range of materials disposed therein which system accomplishes this cleaning with the following advantages:
1. water addition is minimized
2. the density of the cleaning pump discharge is maximized
3. the dryness of the wash residues is maximized in order to produce a land fillable cake or, alternatively, a thick slurry which represents a minimum volume for disposal
4. The quality of the centrate is optimized to thereby meet the requirements for recycling this centrate to the process head or sanitary sewer.

Use of the above system will result in three to one or more reduction in waste transportation and disposal compared to current practice and will provide many environmental advantages in the transformation of large volume liquid wastes which now must be ocean or land dumped to smaller volumes of disinfected solid wastes suitable and desirable for sanitary land fill operations.

It will be understood that various changes in the details, materials and arrangement of parts which have been herein described and illustrated in order to explain the nature of this invention may be made by those skilled in the art within the principle and scope of the invention as expressed in the following claims.

It will futher be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed is:

1. A catch basin cleaning system for removing liquid, solid and semi-solid wastes from catch basins comprising:
   a. pumping means including means for injecting liquid under pressure into said catch basin to combine with and suspend wastes therein, and means for removing waste containing liquids therefrom said pumping means further comprising shunt means for selectively returning waste containing liquids directly to said catch basin, said shunt means further comprising shunt density sensor means for determining the solids content of the waste containing liquid removed from said catch basin, and shunt control means responsive to said shunt density sensor means for continuously controlling the amount of said waste containing liquid returned to said catch basin;
   b. equalization means for receiving waste containing liquids from at least said pumping means and temporarily holding said waste containing liquids;
   c. dewatering means for receiving said waste containing liquids from said equlization means and for removing liquid from said waste containing liquids to produce at least a liquid and a thickened portion;
   d. water supply means for supplying liquid at least to said pumping means and for receiving said liquid portion from said dewatering means.

2. The invention of claim 1 wherein said pumping means further comprises ejector means for introducing liquid under pressure into said catch basin.

3. The invention of claim 2 wherein said shunt means further comprises ejector bypass means for selectively controlling the amount of said waste containing liquid returned to said catch basin which is returned through said ejector means.

4. The invention of claim 1 wherein said shunt means further comprises a screening means for separating large particles from said waste containing liquid prior to being monitored by said shunt density sensor means.

5. The invention of claim 1 wherein said shunt means further comprises shunt flow rate monitor means to monitor the flow of waste containing liquids to be returned to said catch basin.

6. The invention of claim 1 wherein said shunt density sensor means further comprises means for activating said water supply means to dilute said waste containing liquid removed from said catch basin, whereby the percentage of solid wastes contained in said liquid may be selectively reduced.

7. The invention of claim 1 wherein said dewatering means further comprises a dewatering density sensor means for sensing the percentage of solid waste contained within liquids received from said equalization means, and further wherein said dewatering density sensor means comprises dewatering control means for controlling the nature of the response of said shunt control means whereby said dewatering control means is capable of modifying the density of waste containing liquid introduced into said equalization means.

8. The invention of claim 1 wherein said equalization means further comprises and equilization tank and a level sensing means for determining the level of waste containing liquid within said tank and for controlling the input of waste containing liquid into said tank in proportion to the level of waste containing liquid in said tank and the percentage of solids within said waste containing liquid to be introduced into said tank.

9. The invention of claim 8 wherein the equilization means further comprises an equilization flow rate monitor means for monitoring the rate of flow of waste containing liquids received from said pumping means.

10. The invention of claim 9 wherein said equalization flow rate monitor further comprises means for increasing the flow of waste containing liquids from said pumping means.

11. The invention of claim 10 wherein said means for increasing said flow further comprises means for activating said water supply means for supplying water to said pumping means.

12. The invention of claim 8 wherein the equilization means further comprises a degritting means for removing and conveying small particulate materials for collection.

13. The invention of claim 8 wherein said equalization means further comprises an agitator for homogenizing the waste containing liquids retained in said equalization tank.

14. The invention of claim 1 wherein said equilization means further comprises means for receiving waste containing liquid from said dewatering means.

15. The invention of claim 1 wherein said dewatering means further comprises a dewatering density sensor means for sensing the percentage of solid wastes contained within liquids received from said equalization means.

16. The invention of claim 15 wherein said dewatering means further comprises a recirculation means for recirculating said thickened portion to said equilization means in response to a pre-selected determination of the solids content thereof by said dewatering density sensing means.

17. The invention of claim 1 wherein said dewatering means further comprises centrate sensing means for sensing the quality of said liquid portion and for selectively controlling the amount of said liquid portion returned to said pumping means.

18. The invention of claim 7 wherein said dewatering means further comprises a treating means responsive to said centrate sensing means for selectively controlling the quality of said liquid portion.

19. The invention of claim 17 wherein said centrate sensing means is a turbidity sensing means for sensing the turbidity of said liquid portion.

20. The invention of claim 19 wherein said treating means further comprises a polymer feed means responsive to said turbidity sensing means, for selectively controlling the turbidity of said liquid portion.

21. The invention of claim 17 wherein said centrate sensing means is a pH sensing means for sensing the pH of said liquid portion.

22. The invention of claim 21 wherein said treating means is responsive to said pH sensing means and wherein said treating means further selectively controls the pH of the waste containing liquids prior to separation into liquid and thickened portions.

23. The invention of claim 1 wherein said catch basin cleaning system further comprises a cake disposal means for selectively conditioning and removing said thickened portion to produce a land fillable material.

24. The invention of claim 23 wherein said cake disposal means further comprises conditioner feed means for conditioning said thickened portion and a dry mixing means for mixing said thickened portion with said conditioners to produce a land fillable material.

25. The invention of claim 1 wherein said water supply means comprises a virgin water input means for supplying liquid to said system, and a process head output means for receiving liquid from said system and means for selectively supplying liquid received from said dewatering means to said pumping means.

* * * * *